(12) United States Patent
Jeon et al.

(10) Patent No.: US 10,903,882 B2
(45) Date of Patent: Jan. 26, 2021

(54) METHOD AND APPARATUS FOR WIRELESS COMMUNICATIONS

(71) Applicant: SAMSUNG ELECTRONICS CO., LTD., Suwon-si (KR)

(72) Inventors: Eun Sung Jeon, Seoul (KR); Min Ki Ahn, Seoul (KR); Wook Bong Lee, San Jose, CA (US); Sung Soo Kim, Seoul (KR); Joon Suk Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 16/233,628

(22) Filed: Dec. 27, 2018

(65) Prior Publication Data

US 2020/0007204 A1 Jan. 2, 2020

(30) Foreign Application Priority Data

Jun. 27, 2018 (KR) ........................ 10-2018-0073999

(51) Int. Cl.
*H04B 7/0456* (2017.01)
*H04B 7/06* (2006.01)
*H04L 5/00* (2006.01)
*H04L 1/00* (2006.01)
*H04B 7/0417* (2017.01)

(52) U.S. Cl.
CPC ......... *H04B 7/0486* (2013.01); *H04B 7/0417* (2013.01); *H04B 7/0617* (2013.01); *H04L 1/0003* (2013.01); *H04L 5/005* (2013.01)

(58) Field of Classification Search
CPC ...... H04B 7/06; H04B 7/0417; H04B 7/0478; H04B 7/0482; H04B 7/0486; H04L 1/0003; H04L 5/005
See application file for complete search history.

(56) References Cited

U.S. PATENT DOCUMENTS

| 7,961,802 | B2 | 6/2011 | Li et al. |
| 8,243,582 | B2 | 8/2012 | Pun et al. |
| 8,315,346 | B2 | 11/2012 | Kim et al. |
| 8,724,728 | B2 | 5/2014 | Choi et al. |
| 8,971,272 | B2 | 3/2015 | Kim et al. |
| 9,094,075 | B2 | 7/2015 | Liu et al. |

(Continued)

FOREIGN PATENT DOCUMENTS

KR 1020190034982 A 4/2019

OTHER PUBLICATIONS

Yang-Seok Choi, et al., A Pragmatic PHY Abstraction Technique for Link Adaptation and MIMO Switching, IEEE Journal on Selected Areas in Communications, vol. 26, No. 6, Aug. 1, 2008.

*Primary Examiner* — Kent Krueger
(74) *Attorney, Agent, or Firm* — Volentine, Whitt & Francos, PLLC

(57) ABSTRACT

A method for wireless communications includes: receiving a sounding packet from an access point; determining a rank of a channel matrix corresponding to a communications channel; and when the rank of the channel matrix is a full rank: selecting at least one of a plurality of pieces of codebook information previously stored in a memory, as beamforming information, transmitting the beamforming information to the access point, and applying channel smoothing to a communications channel provided by the access point.

20 Claims, 12 Drawing Sheets

(56) References Cited

U.S. PATENT DOCUMENTS

| | | | |
|---|---|---|---|
| 9,654,272 B2 | 5/2017 | Nam et al. | |
| 9,680,538 B2 | 6/2017 | Xia et al. | |
| 9,843,376 B2 | 12/2017 | Khojastepour | |
| 9,893,855 B2 | 2/2018 | Kim et al. | |
| 2010/0188966 A1* | 7/2010 | Pun | H04B 7/0417 |
| | | | 370/203 |
| 2014/0334564 A1 | 11/2014 | Singh et al. | |
| 2015/0349861 A1 | 12/2015 | Lee et al. | |
| 2017/0257153 A1 | 9/2017 | Xia et al. | |
| 2019/0097694 A1 | 3/2019 | Jeon et al. | |

\* cited by examiner

METHOD AND APPARATUS FOR WIRELESS COMMUNICATIONS

CROSS-REFERENCE TO RELATED APPLICATION(S)

This application claims benefit of priority to Korean Patent Application No. 10-2018-0073999 filed on Jun. 27, 2018 in the Korean Intellectual Property Office, the disclosure of which is incorporated herein by reference in its entirety.

BACKGROUND

1. Field

The present inventive concept relates to a method and an apparatus for wireless communications.

2. Description of Related Art

In a communications environment using multiple transmission antennas and multiple reception antennas, a beamforming process may be used to improve communication performance. The beamforming process may include a process of adjusting the gains of antennas and the direction/range or the like of a beam, based on the quality of a communications channel established between the transmission side and the reception side. Beamforming information including a beam steering matrix is required to adjust the gains of antennas and the direction/range or the like of the beam. In the case in which the beamforming information is not properly generated, the performance of a communications channel may deteriorate, or the effect of a beamforming technique may not be sufficiently obtained.

SUMMARY

An aspect of the present inventive concept is to provide a method and an apparatus for wireless communications, in which beamforming information is fed back to a transmission side, depending on whether a rank of a channel matrix corresponding to a communications channel is a full rank, and whether a channel smoothing function is activated may be determined.

According to an aspect of the present inventive concept, a method for wireless communications includes a wireless communication device determining a rank of a channel matrix corresponding to a communications channel provided by an access point, based on a sounding packet received by the wireless communication device from the access point. The method further includes when the rank of the channel matrix is a full rank: the wireless communication device selecting at least one of a plurality of pieces of codebook information previously stored in a memory associated with the wireless communication device as beamforming information, the wireless communication device transmitting the beamforming information to the access point, and the wireless communication device applying channel smoothing to the communications channel.

According to another aspect of the present inventive concept, a method for wireless communications includes: an access point transmitting a sounding packet to a modem of an external electronic device, the access point receiving feedback information from the modem, and determining a rank of a channel matrix corresponding to a communications channel, having transmitted the sounding packet, based on the feedback information. The method further includes when the rank of the channel matrix is a full rank: selecting at least one of a plurality of pieces of codebook information previously stored in a memory, as beamforming information, and recommending the modem to activate channel smoothing.

According to yet another aspect of the present inventive concept, a method for wireless communications includes evaluating, by a modem, a quality of a communications channel provided by an access point, based on a sounding packet received from the access point; determining, by the modem, a rank of a channel matrix corresponding to the communications channel, using the quality of the communications channel and modeling information stored in a memory associated with the modem; selecting, by the modem, one of a plurality of pieces of codebook information stored in the memory as beamforming information, when the rank of the channel matrix is a full rank; transmitting, by the modem, the beamforming information to the access point and activating channel smoothing when the rank of the channel matrix is the full rank; and transmitting and receiving, by the modem, a signal with the access point, using a modulation and coding scheme selected by a processor based on the quality of the communications channel, when a communications channel with the access point is set.

According to still another aspect of the present inventive concept, an apparatus for wireless communications includes: a memory configured to store modeling information which may be employed to determine a rank of a communications channel; a modem configured to determine a rank of a channel matrix corresponding to the communications channel, using a quality of the communications channel and the modeling information, and to determine beamforming information, channel smoothing activation, and a modulation and coding scheme based on the rank of the channel matrix; and a processor configured to process a signal transmitted and received by the modem with reference to the modulation and coding scheme determined by the modem.

According to a further aspect of the present inventive concept, an apparatus for wireless communications includes: a radio frequency (RF) circuit configured to transmit a sounding packet through a communications channel and receiving feedback information from an electronic device having received the sounding packet; a memory configured to store, modeling information to determine a rank of a channel matrix corresponding to the communications channel, and a plurality of pieces of codebook information usable as beamforming information; and a controller configured to: determine a rank of the communications channel, based on at least one of the feedback information and the modeling information, execute a beamforming process using one of the plurality of pieces of codebook information as the beamforming information when the rank of the communications channel is a full rank, and transmit a signal recommending channel smoothing activation to the electronic device.

According to yet a further aspect of the present inventive concept, a method comprises: a wireless communication device having a plurality of wireless communication device antennas receiving a sounding packet from an access point providing access to the Internet, wherein the access point has a plurality of access point antennas and wherein the wireless communication device receives the sounding packet via a communication channel between the access point and the wireless communication device; the wireless communication device ascertaining a quality of the communication channel from the received sounding packet; the wireless communication device ascertaining a rank of a channel matrix corresponding to the communication channel from the ascertaining a quality of the communication channel; the wireless communication device selecting a feedback mode based on the rank of the channel matrix; the wireless communication device transmitting feedback information to the access point based on the selected feedback mode; and the wireless communication device determining, depending on the feedback mode, whether to activate channel smoothing for the communication channel.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, example embodiments of the present inventive concept will be described with reference to the accompanying drawings.

Figure 1:
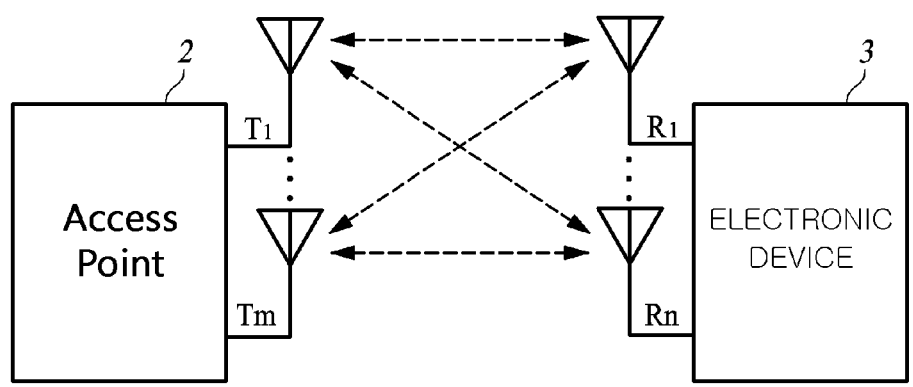
FIGS. 1 and 2 are schematic views of a system to which a method for wireless communications according to an example embodiment of the present inventive concept may be applied.
Figure 2:
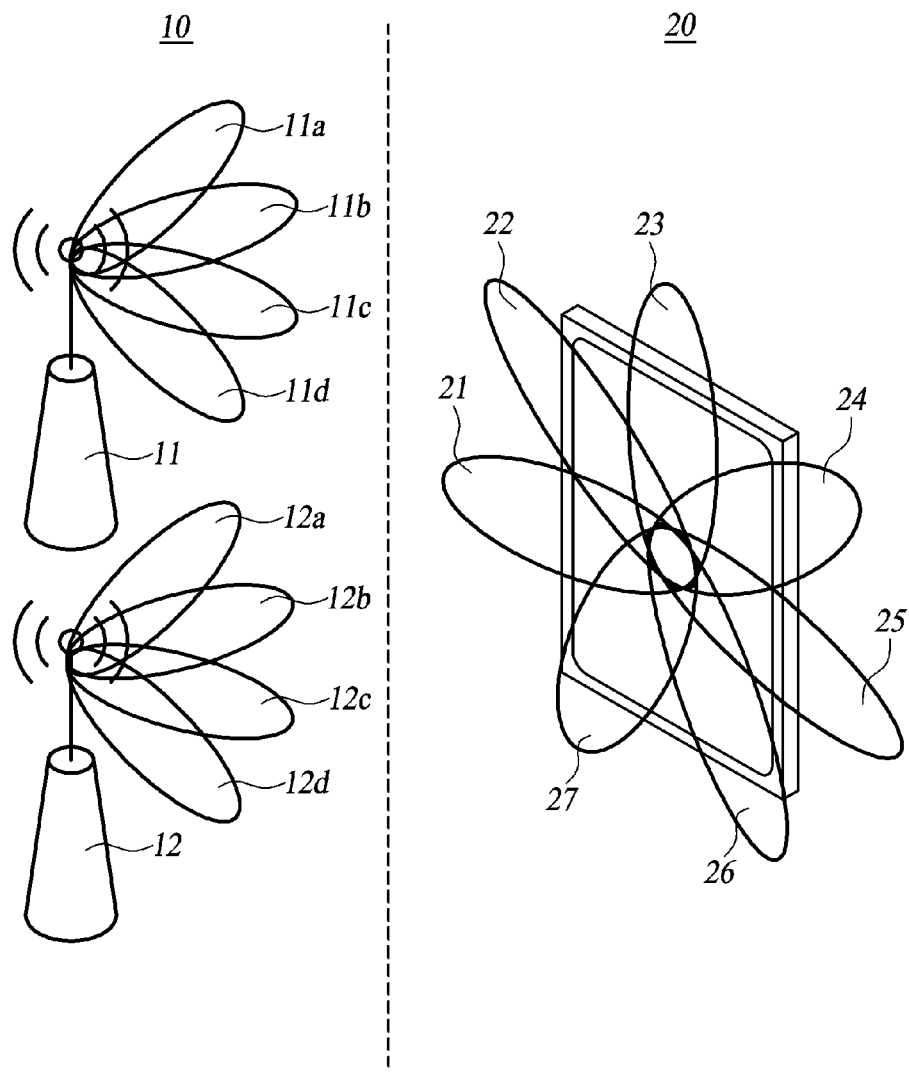

FIGS. 1 and 2 are schematic views of a system to which a method for wireless communications according to an example embodiment may be applied.

Referring to FIG. 1, a method for wireless communications according to an example embodiment may be applied to a system 1 in which a first wireless communications device 2 and a second wireless communications device 3 each include a plurality of antennas. First wireless communications device 2 may be an access point providing a wireless Internet environment, and second wireless communications device 3 may be an electronic device such as a smartphone, a tablet PC, a computer, a television, an air conditioner, or the like, using the wireless Internet environment.

Referring to FIG. 1, signals emitted by respective antennas T1 to Tm of first wireless communications device 2 may be transmitted to antennas R1 to Rn of second wireless communications device 3. In a communications environment between first wireless communications device 2 and second wireless communications device 3, the relationship between transmission signals and reception signals may be represented by the following equation 1.

$$Y = H \cdot X + N \quad \text{[Equation 1]}$$

In the above Equation 1, Y may be received signals, X may be transmission signals, and N may be a noise signal, e.g., a white Gaussian noise signal. H is a channel matrix representing the frequency response. In the example embodiment illustrated in FIG. 1, the channel matrix H may have n rows and m columns.

To obtain improved performance in a communications environment in which data is exchanged through first wireless communications device 2, second wireless communications device 3 may generate beamforming information required for a beamforming process of first wireless communications device 2, to feedback the beamforming information to first wireless communications device 2. The beamforming process may be a technique in which a beam emitted by the antennas T1 to Tm of first wireless communications device 2 may be concentrated in second wireless communications device 3. In this case, communications efficiency may be increased using the beamforming technique.

Referring to FIG. 2, first wireless communications device 10, providing a wireless communications environment, may include a plurality of antennas 11 and 12, and antennas 11 and 12 may emit beams 11a to 11d and 12a to 12d, respectively, in a plurality of directions. On the other hand, second wireless communications device 20, such as a smartphone, a tablet PC, or the like, may receive signals through beams 21 to 27 from a plurality of different directions. Thus, to improve the communications performance between first wireless communications device 10 and second wireless communications device 20, a beamforming process of providing directionality to beams 11a to 11d and 12a to 12d emitted by first wireless communications device 10 may be executed in first wireless communications device 10. In an example, gains of antennas 11 and 12, and the directions and ranges of beams 11a to 11d and 12a to 12d, or the like, may be adjusted by the beamforming process.

In an example embodiment, second wireless communications device 20 may feedback the beamforming information required for the beamforming process to first wireless communications device 10. For example, second wireless communications device 20 may be connected to a communications environment, and may then receive a sounding packet from first wireless communications device 10 to estimate a channel matrix. Second wireless communications device 20 may apply a singular value decomposition (SVD) calculation to the estimated channel matrix to obtain a beam steering matrix required for the beamforming process of first wireless communications device 10, and may feedback the beam steering matrix to first wireless communications device 10, as beamforming information. In an example, the beam steering matrix may be calculated by the following equation 2.

$$H = U \cdot \Sigma \cdot V^H \quad \text{[Equation 2]}$$

In Equation 2 above, H indicates a channel matrix, U and V indicate unitary matrices in which a conjugate transpose matrix is an inverse matrix, and $\Sigma$ indicates a diagonal matrix including channel singular values. The beam steering matrix may be V, and $V^H$ may be the conjugate transpose matrix of the beam steering matrix V. In an example, for each of the subcarriers included in a frequency band of a communications channel, different beam steering matrices V may be applied. Second wireless communications device 20 may perform a singular value decomposition calculation as in Equation 2, to obtain the beam steering matrix V for each subcarrier. First wireless communications device 10 may receive the beam steering matrix V as feedback to execute a beamforming process for each subcarrier. For example, when the beamforming process using the beam steering matrix V is executed, the relationship between a transmission signal and a received signal may be defined as in Equation 3. For example, the channel matrix may be redefined as H·V.

$$Y=H\cdot V\cdot X+N \qquad \text{[Equation 3]}$$

In a general case, when the beamforming process using the beam steering matrix V is completed, first wireless communications device 10 may apply channel smoothing to the communications channel. However, different beam steering matrices V can be applied to at least portions of subcarriers of the communications channel, and in this case, the effect of applying the different beam steering matrices V to the at least portions of subcarriers may become meaningless due to channel smoothing. Second wireless communications device 20 should perform the singular value decomposition calculation to obtain the beam steering matrix V, even in the case in which the effect of the beamforming process is cancelled by channel smoothing. Thus, a problem such as computation burden and an increase in power consumption, and/or response time delay of second wireless communications device 20 may occur.

Figure 3:
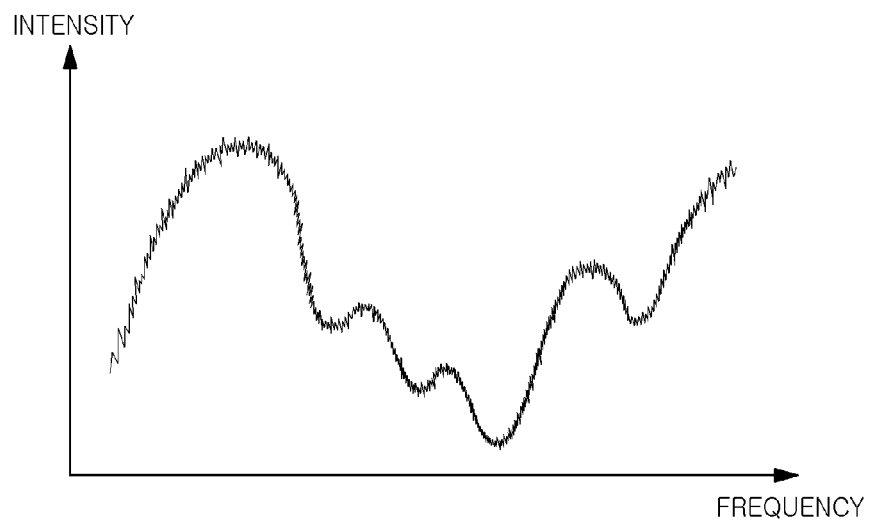
FIGS. 3 and 4 are graphs illustrating the effect of a method for wireless communications according to an example embodiment of the present inventive concept.
Figure 4:
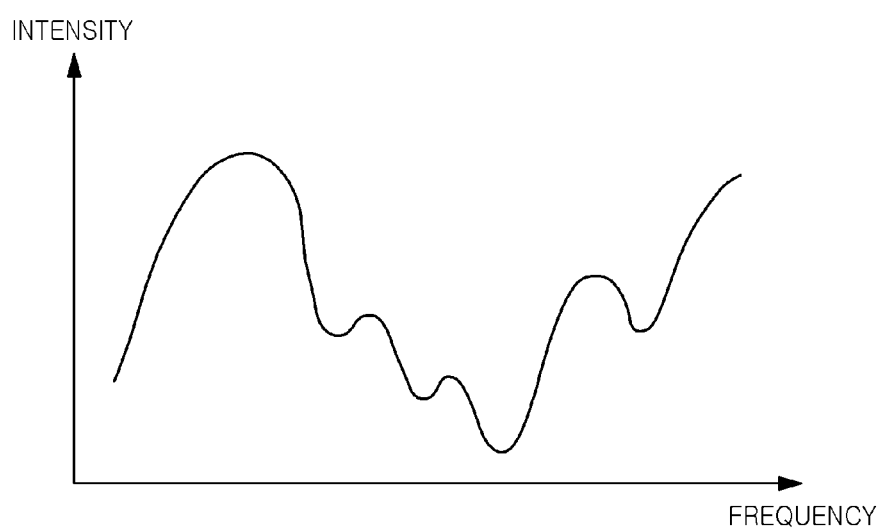

FIG. 3 and FIG. 4 are graphs illustrating the effect of a method for wireless communications according to an example embodiment.

FIG. 3 is a graph illustrating the intensity of the communications channel as a function of frequency, before the channel smoothing is applied. For example, a horizontal axis of FIG. 3 may correspond to indexes of subcarriers classified by the frequency of the communications channel. Referring to FIG. 3, the communications channel may have different intensities in each of the subcarriers.

FIG. 4 is a graph illustrating the intensity of the communications channel as a function of frequency, after channel smoothing is applied. For example, when the channel smoothing is applied, the difference in intensity of the communications channels appearing at a boundary between the subcarriers may be canceled, such that the intensity as a function of frequency may be expressed gently as illustrated in FIG. 4.

Thus, if channel smoothing is applied after the beamforming process performed by applying different beam steering matrices to at least portions of subcarriers of the communications channel, the effect of the beamforming process using a beam steering matrix may be canceled by channel smoothing. In this case, as described above, problems including unnecessary computational burden, power consumption increase and response time delay, or the like of a receive side modem, may occur, and the effect of the beamforming process may be cancelled, thereby causing deterioration in the communications performance.

In an example embodiment, to prevent the above problems, after a modem of an electronic device receives a sounding packet from an access point, beamforming information required for a beam steering process may be differently generated based on different communications environments. In addition, whether to apply channel smoothing may be determined differently based on different communications environments. Thus, the amount of computation to generate beamforming information may be appropriate to the communications environment, to reduce the computational burden and power consumption of the received side modem, and communications performance may be improved by applying channel smoothing only when appropriate.

Figure 5:
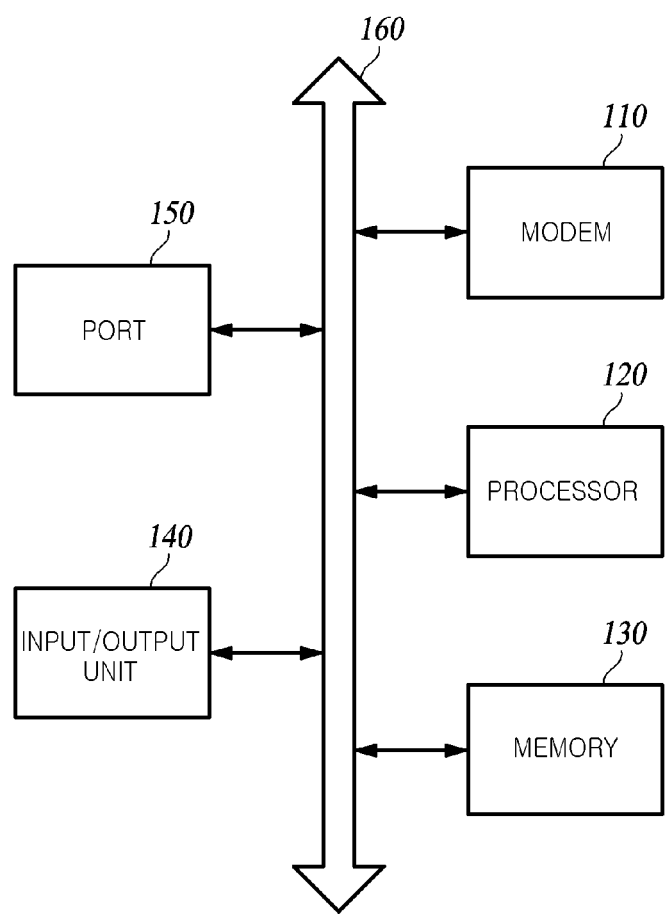
FIG. 5 is a schematic block diagram of an example embodiment of an apparatus for wireless communications.

FIG. 5 is a schematic block diagram of an example embodiment of an apparatus for wireless communications.

An example embodiment of an apparatus 100 for wireless communications illustrated in FIG. 5 may include an access point providing a wireless communications environment, and the like, as well as electronic devices such as smartphones, tablet PCs, smart wearable devices or the like, in addition to general desktop computers and laptop computers. Apparatus 100 for wireless communications may include a modem 110, a processor 120, a memory 130, an input/output unit 140, a port 150, and the like. In addition, apparatus 100 for wireless communications may further include a power supply device, a sensor module, and the like. Among the components illustrated in FIG. 5, port 150 may be a device through which apparatus 100 for wireless communications communicates with a memory card, a USB device, an external display, or the like.

Modem 110 may be connected to an external device through a communications channel. For example, when apparatus 100 for wireless communications is an electronic device such as a smartphone, a tablet PC, a computer or the like, the external device connected to modem 110 may be a Wi-Fi device that provides a wireless communications environment. When the communications channel is connected to modem 110, modem 110 may receive a sounding packet through the communications channel to determine a rank of a channel matrix corresponding to the communications channel Modem 110 and/or processor 120 may generate beamforming information required for an external communications device to proceed with the beamforming process, and may determine whether to activate channel smoothing, based on whether the rank of the channel matrix is a full rank.

Processor 120 may perform specific arithmetic operations, commands, tasks, and the like. Processor 120 may be a central processing unit (CPU), a microprocessor unit (MCU), an application processor (AP) or the like, and may communicate with other devices connected to port 150, as well as communicating with modem 110 and memory 130, via a bus 160. According to example embodiments, processor 120 may generate beamforming information or may also determine whether to enable channel smoothing.

For example, when the rank of the channel matrix is a full rank, modem 110 or processor 120 may select one of a plurality of pieces of codebook information previously stored in memory 130 and may apply the selected information as beamforming information. Memory 130 may store an equivalent matrix codebook, a unitary matrix codebook, and the like, as codebook information. For example, when the rank of the channel matrix is a full rank, modem 110 or processor 120 may select one from the equivalent matrix codebook, the unitary matrix codebook, and the like, as the beamforming information. Modem 110 or processor 120 may feedback the equivalent matrix or the unitary matrix to the access point providing a wireless communications environment, as a beam steering matrix.

On the other hand, when apparatus 100 for wireless communications is an access point providing a wireless communications environment, the external device connected to modem 110 may be an electronic device, such as a smartphone, a tablet PC, a computer or the like. For example, when the electronic device is connected to a wireless communications environment provided by modem 110, modem 110 may transmit a sounding packet to the electronic device and may receive feedback information in response to the sounding packet. For example, the feedback information may include a quality of the communications channel, a modulation and coding scheme suitable for the communications channel, and the like.

Modem 110 may determine the rank of the channel matrix corresponding to the communications channel, using feedback information, and may generate a beam steering matrix, based on whether the rank of the channel matrix is a full rank. Modem 110 may also recommend to the electronic device whether to activate channel smoothing based on whether the rank of the channel matrix is a full rank.

Figure 6:
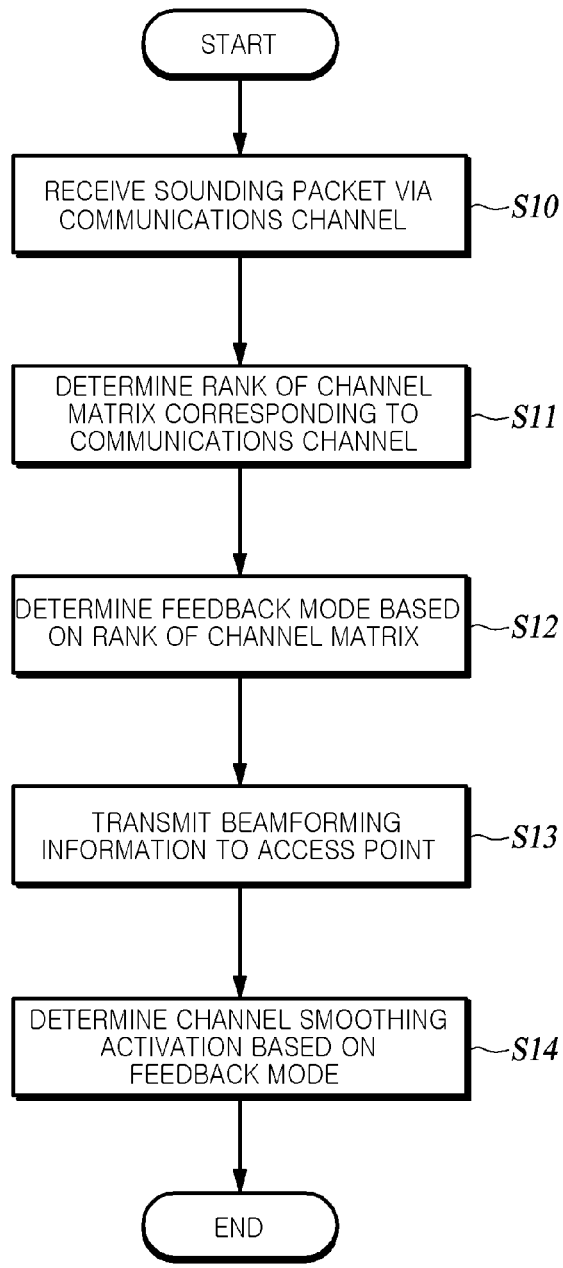
FIGS. 6 and 7 are flowcharts illustrating a method for wireless communications according to an example embodiment of the present inventive concept.
Figure 7:
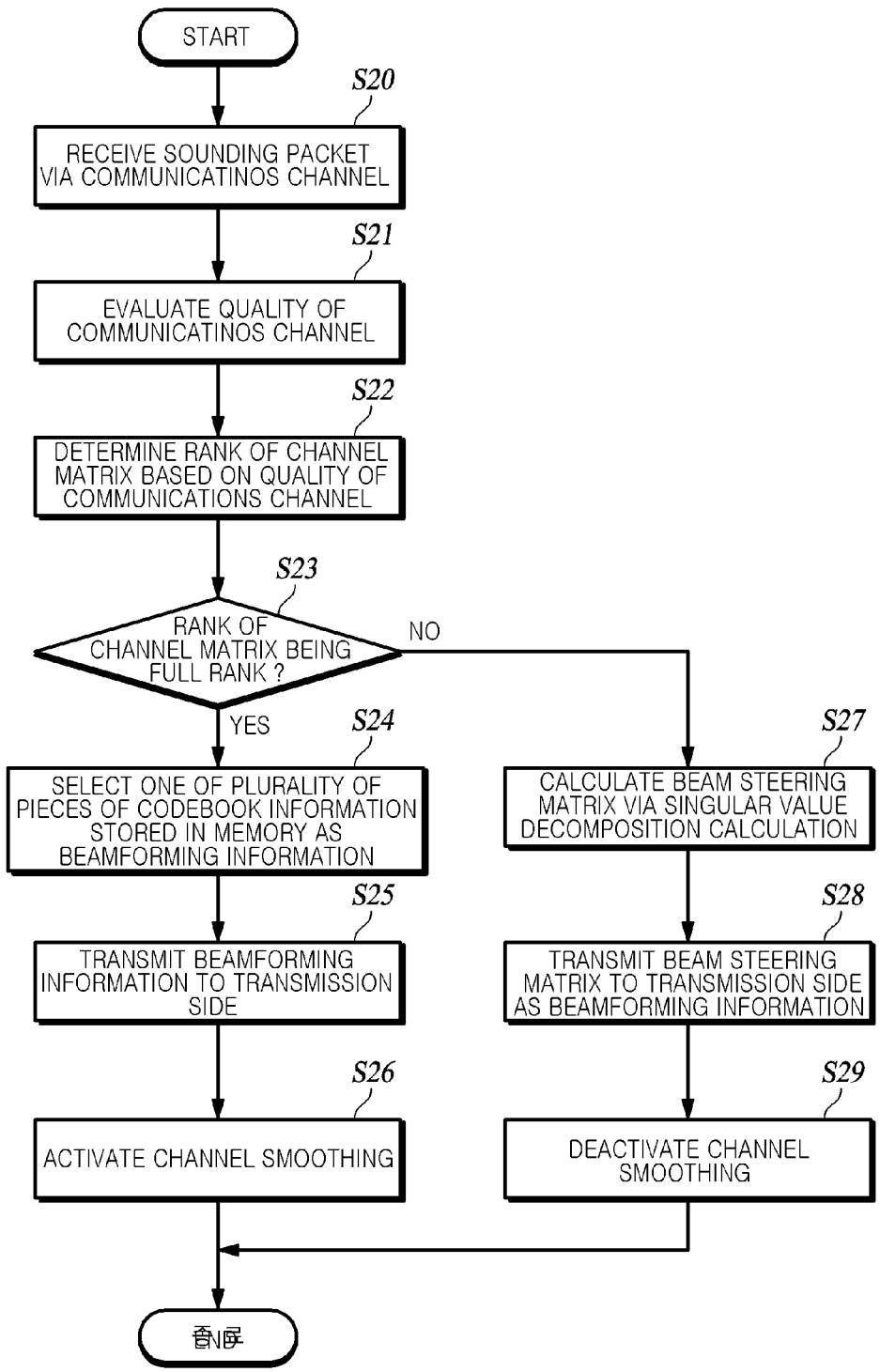

FIGS. 6 and 7 are flowcharts illustrating a method for wireless communications according to an example embodiment. The method for wireless communications described with reference to FIGS. 6 and 7 may be applied to various electronic devices using a wireless communications environment provided by an access point.

Referring to FIG. 6, a method for wireless communications according to an example embodiment may begin in operation S10 with receiving a sounding packet by a modem of an electronic device through a communications channel. For example, a modem may receive a sounding packet from an access point, such as a Wi-Fi device connected thereto via the communications channel. Upon receiving the sounding packet, in operation S11 the modem may determine a rank of the channel matrix corresponding to the communications channel. The channel matrix may be a matrix defining the relationship between a transmission signal and a reception signal as described above with reference to Equation 1.

Based on the rank of the channel matrix determined in operation S11, in operation S12 the modem may determine or select a feedback mode. For example, when the rank of the channel matrix is a full rank, the modem may determine or select a codebook mode as the feedback mode. On the other hand, when the rank of the channel matrix is not a full rank, the modem may or select a singular value decomposition mode as the feedback mode.

For example, when the rank of the channel matrix is a full rank, the modem may determine or form a beam steering matrix by selecting one of a plurality of pieces of codebook information previously stored in a memory inside the modem or a memory mounted in an electronic device, or the like. In an example, the memory may store an equivalent matrix codebook, a unitary matrix codebook and the like, as in Equation 4 below, as codebook information. Pieces of codebook information illustrated in Equation 4 in an example may be applied to a case in which the access point and the electronic device each include two antennas.

$$\text{Equivalent matrix codebook} = \begin{bmatrix} 1 & 0 \\ 0 & 1 \end{bmatrix} \quad \text{[Equation 4]}$$

$$\text{Unitary matrix codebook} = \frac{1}{\sqrt{2}} \begin{bmatrix} 1 & 1 \\ -1 & 1 \end{bmatrix}$$

On the other hand, for example, when the rank of the channel matrix is not a full rank, the modem may determine, form or calculate the beam steering matrix by applying a singular value decomposition calculation to the channel matrix. In an example, the modem may perform the singular value decomposition calculation using the method described above with reference to Equation 2. When the rank of the channel matrix is not a full rank, the modem may use the beam steering matrix obtained through the singular value decomposition calculation, as beamforming information.

In operation S13, the modem may transmit the beamforming information, acquired according to the feedback mode determined in operation S12, to the access point of a transmission side. The access point may adjust gains and service directions and ranges of beams emitted by respective antennas, and the like, using the beamforming information received from the modem.

The modem may determine whether to activate channel smoothing according to the feedback mode determined in operation S12 based on the rank of the channel matrix determined in operation S11. For example, when the feedback mode is determined to be the codebook mode in operation S12 based on the rank of the channel matrix being a full rank, the modem may activate channel smoothing. On the other hand, in the case in which the feedback mode is determined to be the singular value decomposition mode in operation S12 based on the rank of the channel matrix not being a full rank, the modem may deactivate the channel smoothing.

As described above, by using the singular value decomposition calculation, different beam steering matrices may be obtained in at least portions of subcarrier bands of the communications channel. Thus, if channel smoothing is activated after feedback of the beamforming information in the singular value decomposition mode, the effect of beamforming may be canceled. In an example embodiment, in the case in which the beamforming information is generated in the singular value decomposition mode, the channel smoothing may be deactivated, thereby significantly increasing the effect of the beamforming process performed in an external communications device.

Referring to FIG. 7, a method for wireless communications according to an example embodiment may start in operation S20 with receiving a sounding packet by a modem of an electronic device through a communications channel. As described above, the modem may receive a sounding packet from an access point connected thereto through a communications channel. Upon receiving the sounding packet, in operation S21 the modem may evaluate a quality of the communications channel. For example, the modem may evaluate the quality of the communications channel, using parameters such as a data rate of the communications channel, a signal to noise ratio (SNR), or the like.

In operation S22 the modem may determine a rank of a channel matrix, based on a quality of the communications channel, and in operation S23 may determine whether the rank of the channel matrix is a full rank. For example, when the rank of the channel matrix is determined to be a full rank in operation S23, the modem may select a feedback mode as a codebook mode. When the rank of the channel matrix is determined not to be a full rank, the modem may select the feedback mode as a singular value decomposition mode.

When the rank of the channel matrix is determined to be a full rank and the codebook mode is thus selected in operation S23, in operation S24 the modem may select one of a plurality of pieces of codebook information stored in a memory, as beamforming information. As described above, the memory may store various codebooks such as an equivalent matrix codebook, a unitary matrix codebook, and the like. The modem may select one of the plurality of pieces of codebook information stored in the memory to determine a beam steering matrix, and in operation S25 may transmit the beamforming information including the beam steering matrix to an access point of a transmission side. The access point may proceed with a beamforming process, using the beamforming information. As described above with reference to Equation 3, the channel matrix may be changed by the beamforming process.

When feedback is performed in the codebook mode, in operation S26 the modem may activate channel smoothing. The channel smoothing may be applied to a process of exchanging signals with the access point that has completed the beamforming process. In an example, the access point may complete the beamforming process using the beamforming information transmitted by the modem in operation S25, and may set a beamforming field value TxBF to a specific logical value, for example, a high logic value. When feedback of the beamforming information proceeds in the codebook mode, the modem may activate channel smoothing, regardless of the beamforming field value.

On the other hand, when the rank of the channel matrix is determined not be a full rank in operation S23, the modem may set the feedback mode to the singular value decomposition mode. In operation S27, the modem may compute a beam steering matrix from the channel matrix, using the singular value decomposition calculation, and in operation S28 may transmit the beamforming information including the beam steering matrix to the access point of the transmission side. In an example embodiment, for at least portions of subcarrier bands of the communications channel, different beam steering matrices may be calculated.

For example, when the feedback mode is selected as the singular value decomposition mode, in operation S29 the modem may deactivate channel smoothing. The access point may proceed with a beam steering process for the communications channel, using the beam steering matrix received in operation S28, and thus, the access point may set the beamforming field value to a high logic value in a subsequent communications process. When the feedback mode is selected as the singular value decomposition mode, the modem may deactivate channel smoothing by referring to whether the beamforming field value is a high logic value.

In an example embodiment, although the modem acquires the beam steering matrix by using the singular value decomposition calculation and transmits the beam steering matrix to the access point, the access point may not proceed with the beamforming process. In this case, the access point may set the beamforming field value to a low logic value, and the modem may activate channel smoothing even in the case in which the feedback mode is selected as the singular value decomposition mode.

Figure 8:
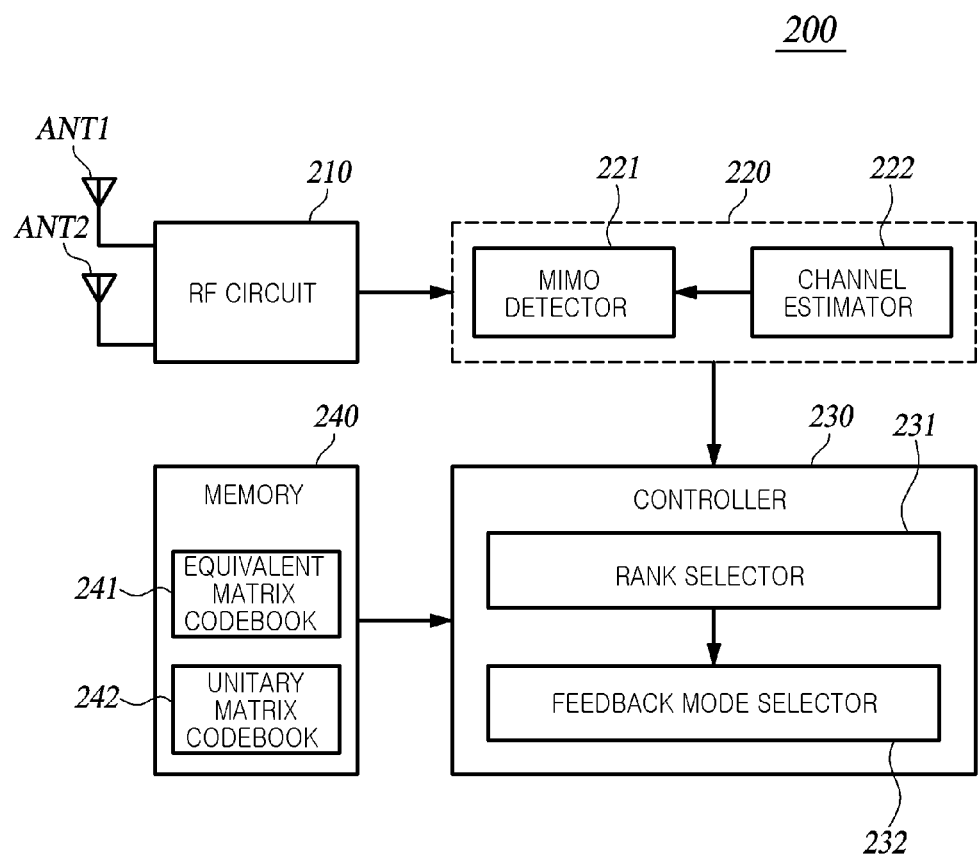
FIG. 8 is a diagram illustrating operations of an example embodiment of an apparatus for wireless communications.

FIG. 8 is a diagram illustrating operations of an apparatus for wireless communications according to an example embodiment.

Referring to FIG. 8, an example embodiment of an apparatus 200 for wireless communications may include a radio frequency (RF) circuit 210, an evaluation module 220, a controller 230, a memory 240, and the like. Although RF circuit 210 is illustrated as transmitting and receiving signals through a first antenna ANT1 and a second antenna ANT2, the number of antennas connected to RF circuit 210 may be variously modified. RF circuit 210 may include a transmitter transmitting a signal, a receiver receiving a signal, a variable gain amplifier amplifying a received signal, an analog to digital converter producing data from a signal, an oscillator generating a frequency signal required for an operation, and the like. RF circuit 210 may receive a sounding packet from an access point and apparatus 200 may generate beamforming information required for a beamforming process of the access point, based on the sounding packet.

Evaluation module 220 may proceed to evaluate a communications channel through which RF circuit 210 has received the sounding packet. In an example, evaluation module 220 may include a multi-input multi-output (MIMO) detector 221 and a channel estimator 222. MIMO detector 221 and channel estimator 222 may evaluate a quality of the communications channel based on signals received through the first antenna ANT1 and the second antenna ANT2, and the quality of the communications channel may include a channel gain, a data rate, a signal-to-noise ratio, a packet error rate, and the like. In an example, channel estimator 222 may estimate a channel rank indicating a channel gain of each of the first and second antennas ANT1 and ANT2, using signals received through the first antenna ANT1 and the second antenna ANT2.

Controller 230 may include a rank selector 231 and a feedback mode selector 232. Rank selector 231 may use the quality of the communications channel evaluated by evaluation module 220, to determine whether the rank of the channel matrix is a full rank. In an example, rank selector 231 may refer to modeling information previously stored in memory 240, to determine the quality of the communications channel evaluated by evaluation module 220 and a recommendation rank of the channel matrix based on the channel rank. Alternatively, the recommendation rank may be determined using the condition number of the communications channel and a specific threshold value.

Feedback mode selector 232 may select one of a codebook mode and a singular value decomposition mode as a feedback mode, depending on whether the recommendation rank selected by rank selector 231 is a full rank. In an example, when the recommendation rank is a full rank, feedback mode selector 232 may select a codebook mode, and when the recommendation rank is not a full rank, the singular value decomposition mode may be selected.

When feedback mode selector 232 selects the codebook mode as the feedback mode, feedback mode selector 232 may select one of a plurality of pieces of codebook information 241 and 242 stored in memory 240, as beamforming information, and may transmit the selected information to the access point of the transmission side. Memory 240 may store equivalent matrix codebook 241, unitary matrix codebook 242, and the like.

In addition, controller 230 may determine whether to activate channel smoothing by the feedback mode. As described above, when channel smoothing is activated in the case in which the feedback mode is the singular value decomposition mode, the effect of the beamforming process performed by the access point of the transmission side may be canceled by channel smoothing. Thus, controller 230 may deactivate channel smoothing when the singular value decomposition mode is selected as the feedback mode. On the other hand, when the codebook mode is selected as the feedback mode, the channel smoothing may be activated by controller 230, which will be described below, by referring to FIG. 9 and FIG. 10 together.

Figure 9:
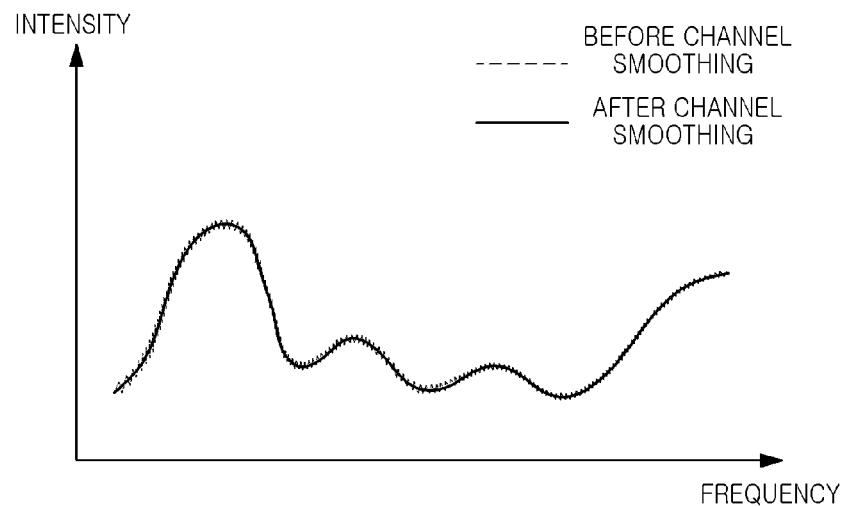
FIGS. 9 and 10 are graphs illustrating the effect of a method for wireless communications according to an example embodiment of the present inventive concept.
Figure 10:
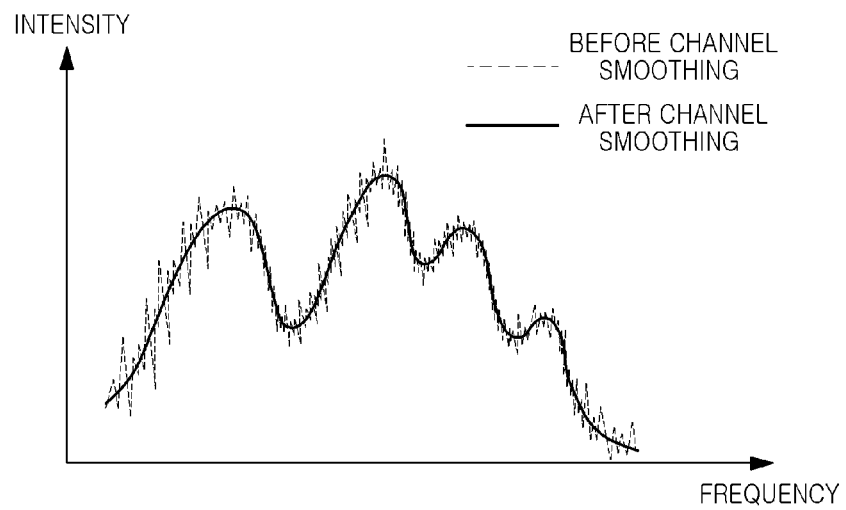

FIGS. 9 and 10 are graphs illustrating the effect of a method for wireless communications according to an example embodiment. The graphs illustrated in FIGS. 9 and 10 indicate the intensity of the communications channel as a function of frequency.

The graph of FIG. 9 may correspond to a case in which rank selector 231 determines a recommendation rank of the channel matrix as a full rank. For example, when the recommendation rank of the channel matrix is a full rank, feedback mode selector 232 may select the codebook mode as the feedback mode. Thus, the same beam steering matrix may be applied to subcarrier bands of the communications channel. As described above, the beam steering matrix may be an equivalent matrix or a unitary matrix stored in memory 240 when the recommendation rank of the channel matrix is a full rank.

When the feedback mode is a codebook mode, the same beam steering matrix may be applied regardless of the subcarrier bands, such that an intensity change of the communications channel based on the frequency may not be high as is illustrated in FIG. 9. Thus, controller 230 may activate channel smoothing and may significantly increase the effect of channel smoothing. In detail, channel smoothing may be activated by controller 230 even in the case in which a beamforming field value transmitted by the access point of the transmission side is a high logic value.

Next, the graph of FIG. 10 may correspond to a case in which the recommendation rank of the channel matrix determined by rank selector 231 is not a full rank. Since the recommendation rank of the channel matrix is not a full rank, feedback mode selector 232 may select a singular value decomposition mode as the feedback mode. Thus, different beam steering matrices may be applied to at least portions of subcarrier bands of the communications channel. In an example embodiment illustrated in FIG. 10, the beam steering matrix may be obtained through a singular value decomposition calculation.

Referring to FIG. 10, the intensity of the communications channel at a boundary between at least portions of the subcarrier bands may greatly change because the different beam steering matrices may be applied to at least portions of subcarrier bands of the communications channel. Thus, in this case, if channel smoothing is applied, the effect of the beamforming process carried out by the access point of the transmission side, based on the beam steering matrix, may be cancelled, which may lead to a decrease in communications performance Thus, in an example embodiment, channel smoothing may be deactivated when feedback mode selector 232 selects a singular value decomposition mode as the feedback mode.

Figure 11:
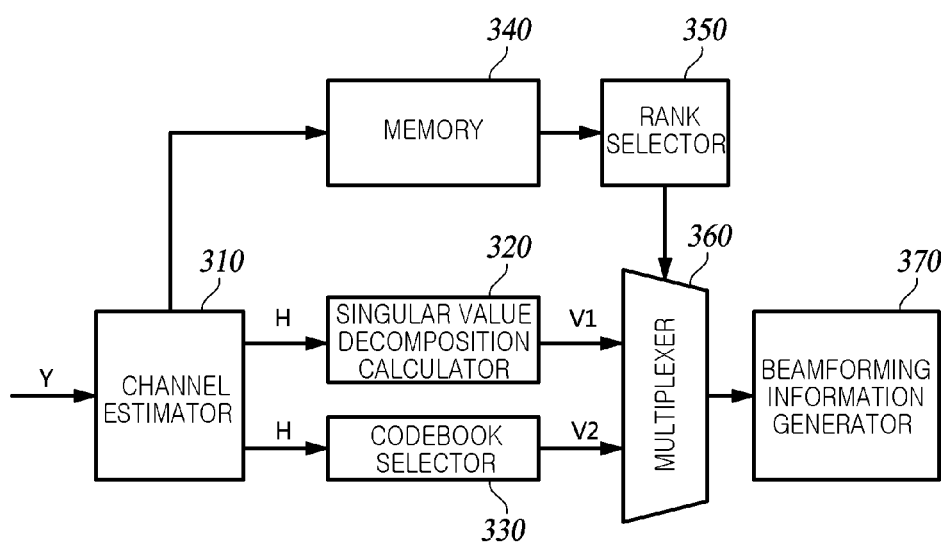
FIG. 11 is a diagram illustrating operations of an example embodiment of an apparatus for wireless communications.

FIG. 11 is a diagram illustrating operations of an apparatus for wireless communications according to an example embodiment.

Referring to FIG. 11, an example embodiment of an apparatus 300 for wireless communications may be an electronic device capable of communicating with an access point that provides a wireless communications environment. Apparatus 300 for wireless communications may include a channel estimator 310, a singular value decomposition calculator 320, a codebook selector 330, a memory 340, a rank selector 350, a multiplexer 360, a beamforming information generator 370, and the like.

Channel estimator 310 may extract a channel matrix H, using a received signal Y generated from a sounding packet transmitted by the access point. The channel matrix H may be input to singular value decomposition calculator 320 and codebook selector 330. In addition, channel estimator 310 may evaluate the quality of communications channel by acquiring the condition number, a signal-to-noise ratio, a data rate and a packet error rate of the communications channel, and the like, using the received signal Y.

Pieces of information regarding the quality of the communications channel, obtained by channel estimator 310, may be stored in memory 340. Memory 340 may store modeling information required to determine a rank of the channel matrix. Rank selector 350 may determine a recommendation rank suitable for the channel matrix H, using the modeling information and pieces of information regarding the quality of the communications channel stored in memory 340. The rank selected by rank selector 350 may be input to multiplexer 360.

Singular value decomposition calculator 320 may generate a first beam steering matrix V1 by applying a singular value decomposition calculation to the channel matrix H. In an example, the first beam steering matrix V1 may be generated by the method described above with reference to Equation 2. Codebook selector 330 may select one of a plurality of pieces of codebook information previously stored in memory 340, as a second beam steering matrix V2. For example, codebook selector 330 may select an equivalent matrix or a unitary matrix as the second beam steering matrix V2.

Multiplexer 360 may select one of the first beam steering matrix V1 and the second beam steering matrix V2 by the rank selected by rank selector 350. Beamforming information generator 370 may transmit the first beam steering matrix V1 or the second beam steering matrix V2 selected by multiplexer 360 to the access point, as the beamforming information. The access point may proceed with a beamforming process, using the first beam steering matrix V1 or the second beam steering matrix V2 received as the beamforming information.

Figure 12:
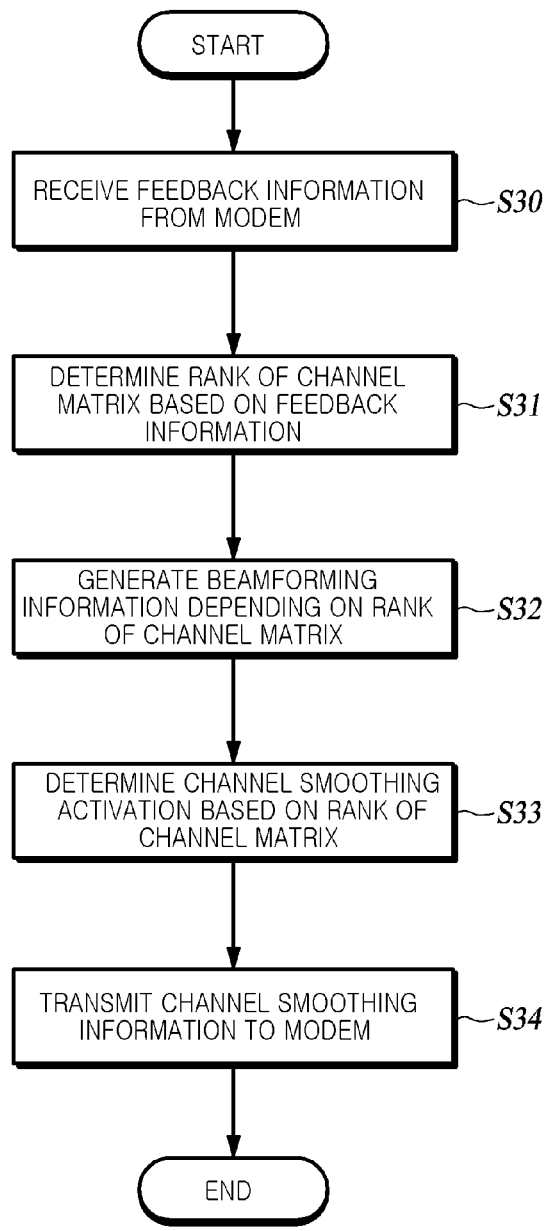
FIGS. 12 and 13 are flowcharts illustrating a method for wireless communications according to an example embodiment of the present inventive concept.
Figure 13:
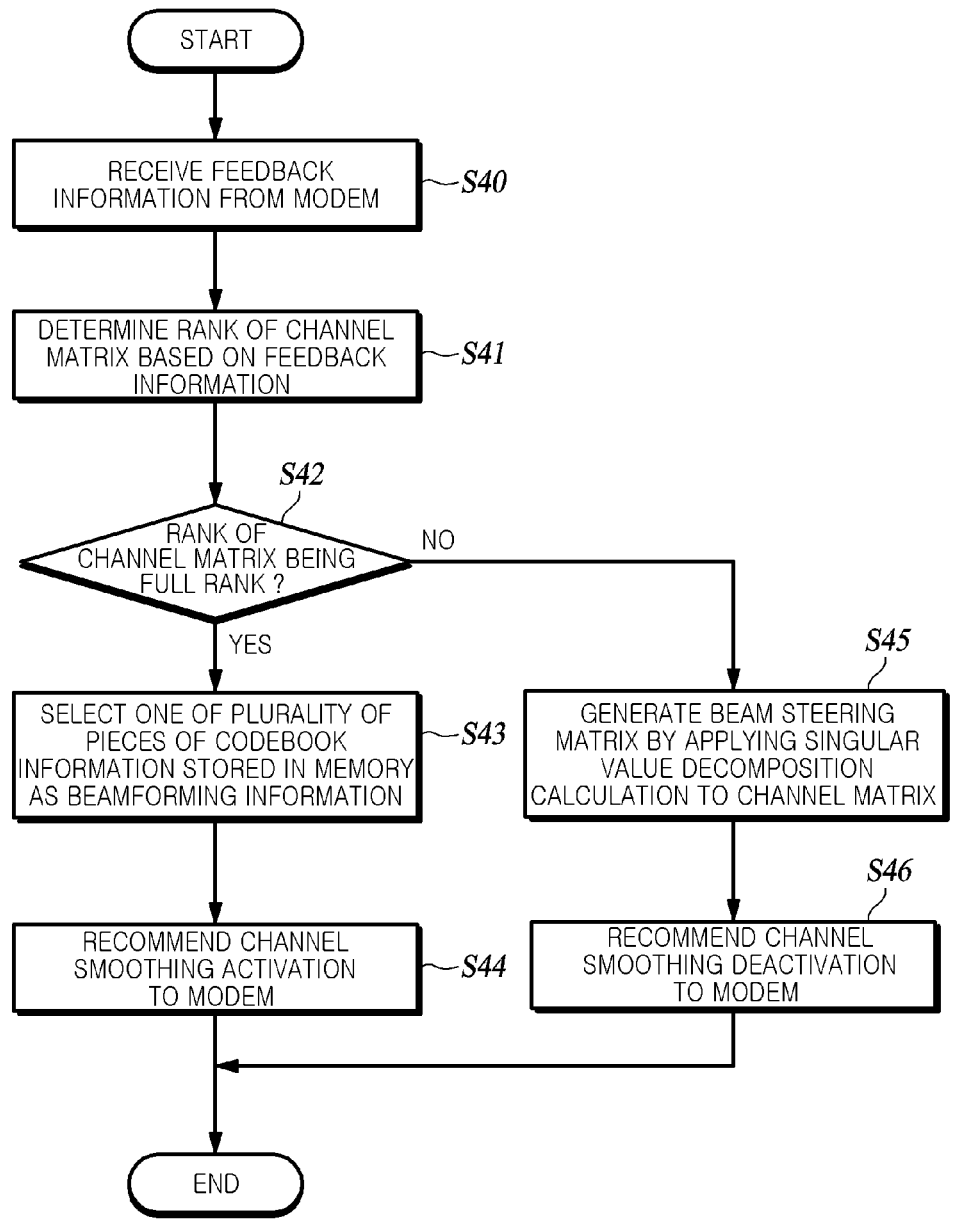

FIGS. 12 and 13 are flowcharts illustrating a method for wireless communications according to an example embodiment. The method for wireless communications described with reference to embodiments of FIGS. 12 and 13 may be applied to an apparatus for wireless communications, such as an access point providing a wireless communications environment.

Referring to FIG. 12, a method for wireless communications according to an example embodiment may start in operation S30 with receiving feedback information by an apparatus for wireless communications from a modem of an electronic device. Prior to receiving feedback information, the apparatus for wireless communications may transmit a sounding packet to an electronic device via a communications channel. The feedback information may include a quality of a communications channel generated by the electronic device, a modulation and coding scheme suitable for the communications channel, a recommendation rank of a channel matrix corresponding to the communications channel, and the like.

The apparatus for wireless communications may determine a rank of the channel matrix corresponding to the communications channel, based on the feedback information, in S31. In an example, the apparatus for wireless communications may determine a rank of the channel matrix, using modeling information and the feedback information having been stored in advance. When the rank of the channel matrix is determined, in operation S32 the apparatus for wireless communications may generate beamforming information based on whether the rank of the channel matrix is a full rank. The beamforming information may include a beam steering matrix.

In an example, when the rank of the channel matrix is not a full rank, the apparatus for wireless communications may directly calculate the beam steering matrix by applying a singular value decomposition calculation to the channel matrix. On the other hand, when the rank of the channel matrix is a full rank, the apparatus for wireless communications may select one of a plurality of pieces of codebook information previously stored in a memory or the like, as a beam steering matrix, without a separate calculation. In an example, the memory may store a unitary matrix codebook and a unitary matrix codebook. When the rank of the channel matrix is a full rank, the apparatus for wireless communications may select the unit matrix or the unitary matrix, as the beam steering matrix, without performing a separate calculation.

Next, in operation S33 the apparatus for wireless communications may determine whether to activate channel smoothing based on the rank of the channel matrix. As described above, to significantly increase the effects of the channel smoothing and beamforming process, channel smoothing may be activated only when the rank of the channel matrix is a full rank. The apparatus for wireless communications may recommend to an electronic device that channel smoothing should be activated when the rank of the channel matrix is a full rank, and may recommend to the electronic device to deactivate channel smoothing when the rank of the channel matrix is not a full rank. In operation S34, the apparatus for wireless communications may transmit channel smoothing information determined based on the criteria, to the electronic device.

In an example embodiment, a modem of the electronic device may determine whether to activate channel smoothing by referring to a beamforming field value received from an apparatus for wireless communications such as an access point or the like. For example, channel smoothing may be deactivated when the beamforming field value is a high logic value, and the channel smoothing may be activated when the beamforming field value is a low logic value. Generally, the beamforming field value may have a high logic value when proceeding with the beamforming process. In detail, in an example embodiment, even when the beamforming process is performed in the case in which the rank of the channel matrix is not a full rank, the beamforming field value may be set to a low logic value, thereby controlling the modem of the electronic device to deactivate channel smoothing.

Next, referring to FIG. 13, a method for wireless communications according to an example embodiment may be started in operation S40 by receiving feedback information by an apparatus for wireless communications from a modem of an electronic device. As described above, the method for wireless communications according to the example embodiment illustrated in FIG. 13 may be performed in an apparatus for wireless communications, such as an access point providing a wireless Internet environment, or the like. Prior to receiving feedback information, the apparatus for wireless communications may transmit a sounding packet to the electronic device via a communications channel. The feedback information may include a quality of a communications channel generated by the electronic device, a modulation and coding scheme suitable for the communications channel, and a recommendation rank of the channel matrix corresponding to the communications channel, and the like.

In operation S41, the apparatus for wireless communications may determine the rank of the channel matrix, based on the feedback information received from the modem of the electronic device, and in operation S42 may determine whether the rank of the channel matrix is a full rank. For example, the apparatus for wireless communications may determine the rank of the channel matrix, using modeling information and feedback information stored in a memory together.

For example, when the rank of the channel matrix is a full rank, in an operation S43 the apparatus for wireless communications may select one of a plurality of pieces of codebook information previously stored in the memory, as beamforming information. The memory may store an equivalent matrix codebook, a unitary matrix codebook, and the like. When the apparatus for wireless communications selects the equivalent matrix codebook as the beamforming information, the equivalent matrix may be used as a beam steering matrix. Further, when the apparatus for wireless communications selects the unitary matrix codebook as the beamforming information, the unitary matrix may be used as the beam steering matrix.

The beam steering matrix based on the codebook information selected in operation S43 may be collectively applied to subcarrier bands of the communications channel Thus, in operation S44 the apparatus for wireless communications may recommend activation of channel smoothing to the modem of the electronic device. In an example, the apparatus for wireless communications may set a beamforming field value transmitted to the electronic device to a high logic value, such that the modem of the electronic device may be controlled to activate channel smoothing in response to the beamforming field value.

For example, when the rank of the channel matrix is not a full rank, the apparatus for wireless communications may generate a beam steering matrix by applying a singular value decomposition calculation to the channel matrix in S45. The singular value decomposition calculation may be performed by the method described above with reference to Equation 2. In an example embodiment, with respect to at least portions of subcarrier bands of the communications channel, different beam steering matrices may be generated. Thus, when the rank of the channel matrix is not a full rank, in operation S46 the apparatus for wireless communications may recommend deactivation of channel smoothing to the modem of the electronic device. In an example, after a beamforming process is performed using a beam steering matrix, the apparatus for wireless communications may forcibly store a beamforming field value as a low logic value, and may transmit the beamforming field value having a low logic value to the electronic device side, thereby controlling the modem of the electronic device to deactivate channel smoothing.

Figure 14:
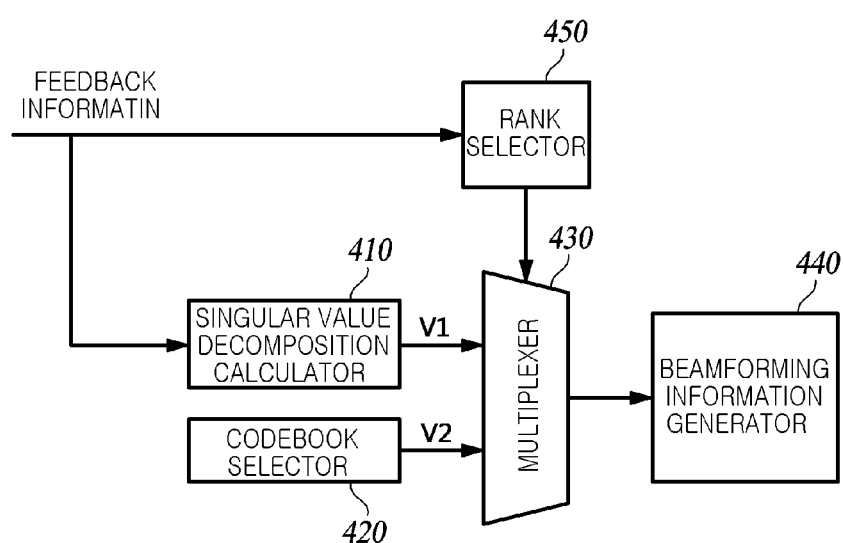
FIG. 14 is a drawing illustrating operations of an example embodiment of an apparatus for wireless communications.

FIG. 14 is a drawing illustrating operations of an apparatus for wireless communications according to an example embodiment.

An example embodiment of an apparatus 400 for wireless communications according illustrated in FIG. 14 may be an access point, such as a Wi-Fi device, providing a wireless communications environment. Apparatus 400 for wireless communications may include a singular value decomposition calculator 410, a codebook selector 420, a multiplexer 430, a beamforming information generator 440, a rank selector 450, and the like.

For example, when an electronic device is connected to a wireless communications environment provided by apparatus 400 for wireless communications, apparatus 400 for wireless communications may transmit a sounding packet to the electronic device, and may receive feedback information in response thereto. The feedback information may include information regarding a quality of a communications channel generated by the electronic device, a modulation and coding scheme suitable for a communications channel, a recommendation rank of the channel matrix corresponding to the communications channel, and the like.

Singular value decomposition calculator 410 may generate a first beam steering matrix V1 by applying a singular value decomposition calculation to the channel matrix, based on feedback information. Codebook selector 420 may generate a second beam steering matrix V2 by selecting one of a plurality of pieces of codebook information stored in a memory, without performing a separate complicated calculation process. For example, the second beam steering matrix V2 may be a unitary matrix or an equivalent matrix.

Multiplexer 430 may select one of the first beam steering matrix V1 and the second beam steering matrix V2, and may transmit the selected beam steering matrix to beamforming information generator 440. Beamforming information generator 440 may generate beamforming information to control gains of antennas included in apparatus 400 for wireless communications, a service direction and range thereof, and the like, using the first beam steering matrix V1 or the second beam steering matrix V2 selected by multiplexer 430.

Multiplexer 430 may select either the first beam steering matrix V1 or the second beam steering matrix V2 by referring to an output of rank selector 450. For example, rank selector 450 may determine a rank of the channel matrix, using feedback information received from the electronic device, may determine whether the rank of the channel matrix is a full rank, and may transmit the determination result to multiplexer 430. Multiplexer 430 may output the first beam steering matrix V1 when the rank of the channel matrix is not a full rank, and may output the second beam steering matrix V2 when the rank of the channel matrix is a full rank.

In conjunction with beam steering for the antennas, the apparatus 400 for wireless communications may determine whether a modem of the electronic device is to activate channel smoothing, using the beamforming field value transmitted to the electronic device. Apparatus 400 for wireless communications may perform beam steering using the first beam steering matrix V1 or the second beam steering matrix V2. On the other hand, in the case in which beam steering on the antennas is performed using the first beam steering matrix V1, the beamforming field value may be forcibly set to a low logic value. Thus, the modem of the electronic device may deactivate channel smoothing, and in a case in which different first beam steering matrices V1 are applied to at least portions of subcarrier bands of the communications channel, the effect of beam steering may be prevented from being cancelled due to channel smoothing.

As set forth above, according to an example embodiment, whether a rank of a channel matrix is a full rank may be determined, based on the quality of a communications channel. For example, when the rank of the channel matrix is a full rank, previously stored codebook information may be used as beamforming information, instead of using a beam steering matrix calculated by a singular value decomposition calculation. Thus, an operation amount of a modem may be reduced to improve power consumption characteristics and reduce calculation burden. In addition, for example, only when the rank of the channel matrix is a full rank, channel smoothing may be activated, thereby significantly increasing the effect of channel smoothing.

While example embodiments have been shown and described above, it will be apparent to those skilled in the art that modifications and variations could be made without departing from the scope of the present inventive concept as defined by the appended claims.

What is claimed is:

1. A method executable by a wireless communication device for wireless communications, the method comprising:
    determining, based on a sounding packet received by the wireless communication device from an access point, a rank of a channel matrix corresponding to a communications channel provided by the access point; and
    in response to determining the rank of the channel matrix is a full rank:
        selecting as beamforming information at least one of a plurality of pieces of codebook information previously stored in a memory associated with the wireless communication device;
        transmitting the beamforming information to the access point; and
        applying channel smoothing to the communications channel.

2. The method of claim 1, wherein the at least one of a plurality of pieces of codebook information is an equivalent matrix codebook or a unitary matrix codebook.

3. The method of claim 1, wherein the channel smoothing is applied, regardless of a beamforming field value received from the access point, in response to determining the channel matrix is the full rank.

4. The method of claim 1, further comprising:
    evaluating a quality of the communications channel using the sounding packet; and
    determining the rank of the channel matrix based on the quality of the communications channel.

5. The method of claim 4, wherein the quality of the communications channel is evaluated by calculating at least one of a signal-to-noise ratio, a packet error rate, a data rate,. and a condition number of the communications channel.

6. The method of claim 1, further comprising in response to determining the rank of the channel matrix is not the full rank:
    entering a singular value decomposition (SVD) mode;
    calculating a beam steering matrix by applying singular value decomposition operation to the channel matrix; and
    transmitting, as the beamforming information, the beam steering matrix to the access point.

7. The method of claim 6, further comprising in response to determining the rank of the channel matrix is not the full rank, deactivating the channel smoothing regardless of a beamforming field value received from the access point.

8. The method of claim 6, wherein different beam steering matrices are generated with respect to at least portions of subcarriers of the communications channel.

9. The method of claim 1, further comprising:
    selecting at least one of a plurality of modulation and coding schemes based on at least one of whether the rank of the channel matrix is the full rank and a quality of the communications channel; and
    transmitting the selected modulation and coding scheme to a processor processing data exchanged with the wireless communications device.

10. The method of claim 9, wherein the quality of the communications channel comprises at least one of a signal-to-noise ratio of the communications channel and a data rate of the communications channel.

11. The method of claim 1, wherein the sounding packet is received from a plurality of antennas included in the access point.

12. A method executable by an access point for wireless communications, the method comprising:
    transmitting a sounding packet to a modem of an external electronic device;
    receiving feedback information from the modem;
    determining, based on the feedback information, a rank of a channel matrix corresponding to a communications channel that conveys the sounding packet; and
    in response to determining the rank of the channel matrix is a full rank:

selecting, as beamforming information, at least one of a plurality of pieces of codebook information previously stored in a memory; and instructing the modem to activate channel smoothing.

13. The method of claim 12, further comprising in response to determining the rank of the channel matrix is not the full rank:

generating a beam steering matrix by applying a singular value decomposition operation to the channel matrix; and instructing the modem to deactivate channel smoothing.

14. The method of claim 12, further comprising in response to determining the rank of the channel matrix is the full rank, selecting as a beam steering matrix one of an equivalent matrix codebook and a unitary matrix codebook.

15. The method of claim 12, wherein the feedback information comprises at least one of a quality of the communications channel, a modulation and coding scheme suitable for the communications channel, and a recommendation rank for the channel matrix.

16. The method of claim 15, wherein the feedback information comprises the modulation and coding scheme selected by the modem, based on at least one of whether the rank of the channel matrix is the full rank and the quality of the communications channel.

17. The method of claim 15, wherein the quality of the communications channel comprises at least one of a signal-to-noise ratio, a data rate, and a packet error rate of the communications channel.

18. The method of claim 12, further comprising in response to determining the rank of the channel matrix is the full rank, setting a beamforming field value transmitted to the modem to a low logic value.

19. The method of claim 12, wherein the rank of the channel matrix is determined based on modeling information previously stored in the memory and the feedback information.

20. A method executable by a modem for wireless communications, the method comprising:

evaluating a quality of a communications channel provided by an access point based on a sounding packet received from the access point;

determining a rank of a channel matrix corresponding to the communications channel using the quality of the communications channel and modeling information stored in a memory associated with the modem;

in response to determining the rank of the channel matrix is a full rank:

selecting, as beamforming information, one of a plurality of pieces of codebook information stored in the memory;

transmitting the beamforming information to the access point; and activating channel smoothing; and transmitting and receiving a signal with the access point using a modulation and coding scheme selected by a processor based on the quality of the communications channel when a communications channel with the access point is established.

* * * * *